United States Patent
Miyasaka et al.

(10) Patent No.: US 8,921,470 B2
(45) Date of Patent: Dec. 30, 2014

(54) RUBBER COMPOSITION FOR ADHERING STEEL CORD

(71) Applicants: Toyo Tire & Rubber Co., Ltd., Osaka (JP); Nippon Steel Chemical Carbon Co., Ltd., Tokyo (JP)

(72) Inventors: Takashi Miyasaka, Osaka (JP); Takashi Yuri, Osaka (JP); Hiroaki Narita, Osaka (JP); Hirofumi Hayashi, Osaka (JP); Yoichi Kawano, Tokyo (JP)

(73) Assignees: Toyo Tire & Rubber Co., Ltd., Osaka (JP); Nippon Steel Chemical Carbon Co., Ltd., Tokyo (JP)

(*) Notice: Subject to any disclaimer, the term of this patent is extended or adjusted under 35 U.S.C. 154(b) by 52 days.

(21) Appl. No.: 13/660,625

(22) Filed: Oct. 25, 2012

(65) Prior Publication Data

US 2013/0048182 A1    Feb. 28, 2013

Related U.S. Application Data

(63) Continuation of application No. 12/266,140, filed on Nov. 6, 2008, now abandoned.

(30) Foreign Application Priority Data

May 9, 2008    (JP) .................. 2008-123785

(51) Int. Cl.
| | | |
|---|---|---|
| C08K 3/00 | (2006.01) | |
| C08K 5/04 | (2006.01) | |
| B05D 1/36 | (2006.01) | |
| B60C 9/00 | (2006.01) | |
| C08K 3/38 | (2006.01) | |

(52) U.S. Cl.
CPC .................... *C08K 3/38* (2013.01)
USPC ........... 524/404; 524/398; 427/409; 152/451

(58) Field of Classification Search
USPC ............. 524/404, 398; 427/409; 152/451
See application file for complete search history.

(56) References Cited

U.S. PATENT DOCUMENTS

| | | | |
|---|---|---|---|
| 4,906,680 | A | 3/1990 | Umeda et al. |
| 5,252,405 | A | 10/1993 | Kaido et al. |
| 5,522,127 | A | 6/1996 | Ozaki et al. |
| 6,330,897 | B1 | 12/2001 | Nakamura et al. |
| 6,476,154 | B1 * | 11/2002 | Maly et al. ............ 525/332.6 |
| 6,730,731 | B2 | 5/2004 | Tobita et al. |
| 6,794,035 | B2 | 9/2004 | Tobita et al. |
| 2003/0064017 | A1 | 4/2003 | Tobita et al. |
| 2004/0126306 | A1 | 7/2004 | Ochiai et al. |
| 2009/0151839 | A1 | 6/2009 | Miyasaka et al. |

FOREIGN PATENT DOCUMENTS

| | | |
|---|---|---|
| JP | 06-305844 | 11/1994 |
| JP | 04-016545 | 1/1995 |

(Continued)

*Primary Examiner* — William Cheung
(74) *Attorney, Agent, or Firm* — Fish & Richardson P.C.

(57) ABSTRACT

A rubber composition for adhering a steel cord that improves wet heat-resistant adhesioness, particularly heat-resistant adhesioness, by preventing adhesion deterioration due to heat, as well as initial adhesioness between a steel cord and a rubber, is disclosed. The rubber composition comprising 100 parts by weight of a diene rubber component and from 0.1 to 30 parts by weight of composite graphite particles containing boron, obtained by heating and graphitizing carbon black together with boron or a compound containing boron.

8 Claims, 1 Drawing Sheet

(56) References Cited

FOREIGN PATENT DOCUMENTS

| JP | 07-009811 | 1/1995 |
| JP | 2000-313609 | 11/2000 |
| JP | 2001-106829 | 4/2001 |
| JP | 2008-303389 | 12/2008 |
| WO | 99/23174 | 5/1999 |
| WO | WO 99/23174 | 5/1999 |

* cited by examiner

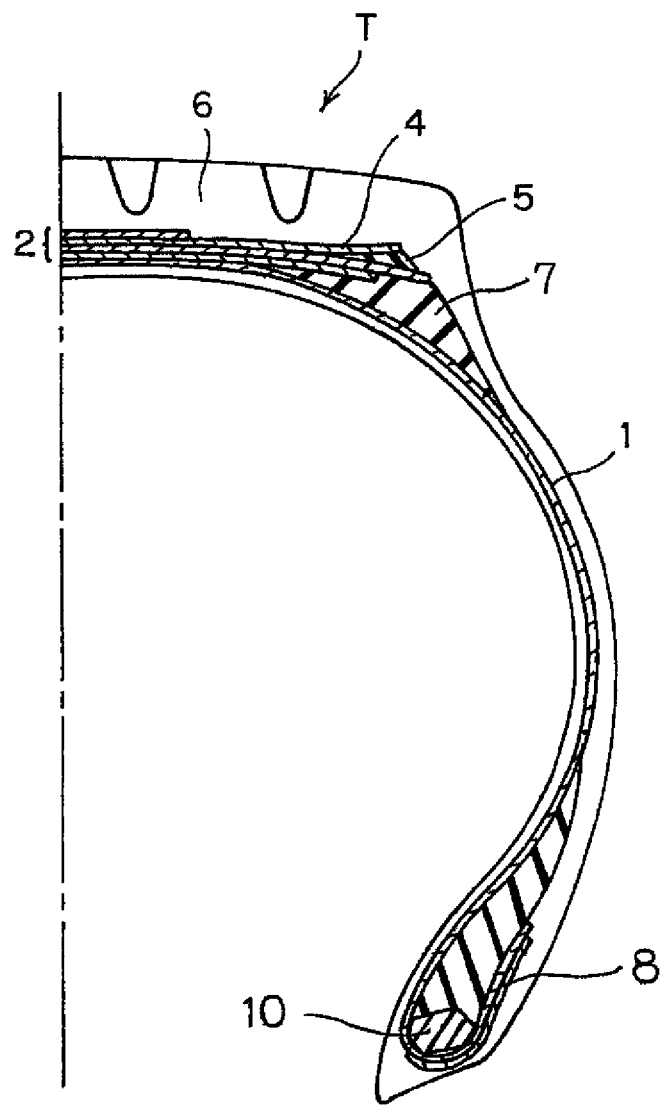

RUBBER COMPOSITION FOR ADHERING STEEL CORD

CROSS-REFERENCE TO RELATED APPLICATIONS

This application is a continuation of U.S. Ser. No. 12/266,140, filed Nov. 6, 2008, which in turn is based upon and claims the benefit of priority from the prior Japanese Patent Application No. 2008-123785, filed on May 9, 2008. The entire contents of the earlier US and Japanese applications are incorporated herein by reference.

BACKGROUND OF THE INVENTION

1. Field of the Invention

The present invention relates to a rubber composition for adhering a steel cord that can improve adhesioness, particularly heat-resistant adhesioness and wet heat-resistant adhesioness, between a steel cord used in a reinforcing material of a pneumatic tire or the like, and a rubber.

2. Background Art

Conventionally, a plating such as brass is applied to a steel cord used in a reinforcing material of a pneumatic tire. As a rubber composition for adhesion to the steel cord, it is known that a reinforcing material such as carbon black, various compounding ingredients such as a vulcanizing agent, and additionally an adhesive component such as resorcin, a resorcin derivative or an organic acid cobalt salt are added to a diene rubber component mainly comprising a natural rubber, thereby improving adhesioness to the steel cord.

In recent years, maintenance and improvement of an expressway, and high performance of vehicles (high speed, high horsepower, high load and the like) proceed, and strain applied to a steel belt or a carcass as the framework of a pneumatic tire is markedly increased. In particular, in view of adhesion deterioration due to generation of heat in a tire during continuous running, deterioration by heat history owing to enhanced life of a tire, deterioration by wet heat, and the like, adhesioness in higher level than the conventional level is required. In the conventional rubber composition having compounded therewith an organic acid cobalt salt, initial adhesioness is excellent, but decrease in adhesioness is large due to heat aging. Thus, it is the current situation that the performance recently required cannot be satisfied, and improvement in heat-resistant adhesioness and wet heat-resistant adhesioness are strongly required.

It is considered that the organic acid cobalt salt has strong oxidation accelerating action, and therefore heat brings about to increase thickness of an adhesive layer, leading to layer failure. From this fact, JP-A-7-9811 describes that wet heat-resistant adhesioness of a steel cord is improved by containing boron in an organic acid cobalt salt. However, this still has the disadvantage that a metal cobalt component accelerates heat deterioration of a rubber composition. JP-A-2001-106829 proposes a rubber composition having added thereto a heat-resistant deterioration inhibition type vulcanization accelerator such as mercapto-4-methylbenzothiazole. However, it is difficult to say that the effect of adhesioness improvement is sufficient. WO 99/23174 A1 discloses a metal-treated carbon black having a silicon-containing phase, a boron-containing phase or the like formed on the surface of carbon black. However, this reference has an object to improve reinforcing properties of a rubber, and adhesioness is not described therein.

SUMMARY OF THE INVENTION

An object of the present invention is to provide a rubber composition for adhering a steel cord that improves wet heat-resistant adhesioness, particularly heat-resistant adhesioness, by preventing adhesion deterioration due to heat, as well as initial adhesioness between a steel cord and a rubber, and can realize both initial adhesion performance and adhesion performance after aging in high level.

As a result of extensive and intensive investigations in view of the above problems, it has been found that the above problem can be solved by adding a graphite type oxidative degradation-preventing component as a component of preventing deterioration of adhesioness between a steel cord and a rubber, particularly adhesion deterioration by heat, to a rubber composition.

That is, the present invention relates to a rubber composition for adhering a steel cord comprising 100 parts by weight of a diene rubber component and from 0.1 to 30 parts by weight of composite graphite particles containing boron, obtained by heating and graphitizing carbon black together with boron or a compound containing boron.

In a preferred embodiment of the rubber composition for adhering a steel cord of the present invention, a molar ratio of a carbide of boron ($B_4C$) constituting the composite graphite particles to the total carbon atoms in the composite graphite particles excluding carbon atoms contained in the carbide is from 1:5 to 1:500.

In further preferred embodiment, the rubber composition for adhering a steel cord is used for adhesion with a steel cord having brass plated thereon.

The present invention also relates to a rubber-steel cord composite comprising a steel cord and the rubber composition. Further, the present invention relates to a pneumatic tire comprising the rubber-steel cord composite.

The rubber composition for adhering a steel cord of the present invention can improve initial adhesioness between a steel cord and a rubber, and additionally heat-resistant adhesioness by improving wet heat-resistant adhesioness, particularly oxidation resistance, by preventing adhesion deterioration due to heat, by oxidation-preventive action of the composite graphite particles, thereby improving durability of rubber products such as a pneumatic tire.

BRIEF DESCRIPTION OF THE DRAWING

The FIGURE is a half sectional view of a tire showing one embodiment of the present invention.

DETAILED DESCRIPTION OF THE INVENTION

The present invention is described in detail below.

A rubber component of the rubber composition for adhering a steel cord (hereinafter sometimes simply referred to as a "rubber composition") of the present invention uses various diene rubbers. The diene rubber includes a natural rubber (NR), a polyisoprene rubber (IR), a styrene-butadiene rubber (SBR), a polybutadiene rubber (BR), a butadiene rubber containing syndiotactic-1,2-polybutadiene (SPB), an end-modified low cis-BR, a chloroprene rubber (CR), and a nitrile rubber (NBR). Those may be used alone or by blending two or more thereof. In the case of a synthetic rubber, its polymerization method and molecular weight are not particularly limited. Above all, NR, IR, SBR and BR are preferred in the points of adhesioness to a steel cord, strength, fatigue resistance and heat buildup.

The composite graphite particles compounded with the rubber composition of the present invention are obtained by heating and graphitizing carbon black together with boron or a compound containing boron.

Heat treatment method of heat treating and graphitizing carbon black is not particularly limited. However, a method for producing composite graphite particles containing boron by induction heating carbon black and boron or a compound containing boron in an induction furnace is preferable, from the necessity of heating carbon black to 1,500° C. or higher.

The induction heating method is, for example, that a carbon crucible is placed in the inside of a ceramic insulator equipped with an induction heating coil, a mixture of carbon black and a small amount of boron or a boron compound added thereto is introduced into the crucible, and high frequency current is applied to the coil to elevate the temperature to 1,500° C. or higher, thereby carbon black can be graphitized.

When this induction heating method is employed, graphitization requiring extremely high temperature in general heating method easily proceeds, thereby forming a graphite structure and a carbide of boron ($B_4C$) on the surface thereof. This facilitates high temperature heat treatment for conducting graphitization treatment, and production cost is reduced.

When boron other than carbon is contained in the graphite particles, oxidation initiation temperature of the graphite particles is elevated, and oxidation resistance is improved. When such graphite particles are compounded with the rubber composition, oxidative deterioration property of the rubber composition is improved, and as a result, heat-resistant adhesioness to a steel cord can be improved. The effect of improving heat-resistant adhesioness is considered to due that the graphite particles have a developed crystal structure as compared with carbon black, and therefore, oxidation initiation temperature is high and oxidation resistance is excellent. Furthermore, boron has the effect of promoting graphitization of carbon black.

Carbon black as a raw material of the graphite particles is not particularly limited, and can use carbon black which is carbonaceous fine particles having a particle size of nanometer order and is a monocyte type (particle diameter: 80 nm or more) or diverse aggregate types (primary particle diameter: several nm or more). It is preferred to graphitize carbon black having an average particle diameter of 500 nm or less. The carbon black has an average particle diameter of preferably 200 nm or less, and more preferably 100 nm or less. Where the average particle diameter exceeds 500 nm, the above effect cannot sufficiently be exhibited, and where the particle size is too small, it is difficult to handle the carbon black, and dispersibility into a rubber is decreased.

The carbon black as a raw material includes oil furnace black and acetylene black. Specific examples of the carbon black include various kinds of carbon black, such as SAF, ISAF, HAF, FEF, GPF, SRF, FT and MT. Those may be used by mixing two or more thereof.

Boron subjected to graphitization treatment together with carbon black includes boron element itself and the compound containing boron. The compound containing boron includes a boric acid such as metaboric acid or orthoboric acid, trimethoxyborane, boron oxide, boron carbide, boron nitride, and a borate (sodium salt or potassium salt). Those can be used as mixtures of two or more thereof.

Each element itself such as Si, Al or Fe, a compound containing those elements, and the like may be added as a material of accelerating graphitization in mixing with carbon black and heating.

A molar ratio of a carbide of boron ($B_4C$) constituting the composite graphite particles to the total carbon atoms (C) in the composite graphite particles excluding carbon atoms contained in the carbide, i.e. a ratio of $B_4C$:C is preferably from 1:5 to 1:500, and more preferably from 1:10 to 1:100. Where the molar ratio of $B_4C$ to carbon atom is less than 1:5, $B_4C$ is excessively formed, and composite graphite particles are not formed. Where the molar ratio exceeds 1:500, graphite single particles are excessively formed. As a result, oxidation resistance is not improved in any case.

The composite graphite particles according to the present invention are obtained by using the above-described carbon black and boron or a boron compound as raw materials and induction heating those in an induction furnace to graphitize. The production of the composite graphite particles can be performed according to the ordinary methods described in, for example, US 2004/0126306 A1.

The rubber composition of the present invention comprises 100 parts by weight of the diene rubber component and from 0.1 to 30 parts by weight of the composite graphite particles compounded therewith. Where the amount of the composite graphite particles compounded is less than 0.1 parts by weight, the object of the present invention is not achieved, and where the amount exceeds 30 parts by weight, the effect of improving heat-resistant adhesioness, commensurate with the amount is not obtained, which is uneconomical.

Carbon black is compounded as a reinforcing agent with the rubber composition according to the present invention. The carbon black is not particularly limited. For example, carbon black having a nitrogen adsorption specific surface area ($N_2SA$) of from 70 to 140 $m^2/g$ is preferred, and the carbon black specifically includes carbon blacks of SAF, ISAF and HAF grades. $N_2SA$ used herein is measured according to JIS K6217.

The amount of the carbon black compounded is from 10 to 100 parts by weight per 100 parts by weight of the diene rubber component. Where the amount of the carbon black compounded is less than 10 parts by weight, hardness of a rubber composition cannot be ensured, and adhesion interfacial failure due to difference in rigidity to a steel cord is liable to be generated. Where the amount exceeds 100 parts by weight, adhesive force is decreased due to the increase in hardness of a rubber, heat buildup deteriorates, and processability deteriorates due to viscosity increase of an unvulcanized rubber.

An adhesive component between a rubber and a steel cord, conventionally used such as an organic acid cobalt salt or resorcins can be compounded with the rubber composition of the present invention.

The organic acid cobalt salt includes cobalt naphthenate, cobalt stearate, cobalt borate, cobalt oleate and cobalt maleate. Cobalt naphthenate and cobalt stearate are preferred from the point of processability.

The amount of the organic acid cobalt salt compounded is from 0.1 to 0.3 parts by weight, in terms of a cobalt metal content, per 100 parts by weight of the rubber component. Where the amount of the organic acid cobalt salt compounded is less than 0.1 parts by weight, initial adhesioness to a steel cord is deficient, and where the amount exceeds 0.3 parts by weight, it is difficult to obtain further effect of improving adhesion, and cost is increased.

Resorcin or resorcin derivative, and as its methylene donor, hexamethylene tetramine or melamine derivative may be compounded. The resorcin derivative includes a resorcin-formaldehyde resin obtained by condensing resorcin and formaldehyde. A phenolic resin such as a phenol-formaldehyde resin or a cresol-formaldehyde resin, obtained by condensing phenols (phenol, cresol or the like) and aldehyde can be used. A resorcin or a resorcin derivative containing an alkyl phenol is preferred from the standpoint of solubility with a rubber component and other components, denseness of a resin after hardening and liability. The resorcin derivative includes a resorcin-alkylphenol-formalin copolymer and a resorcin-formalin reactant penacolite resin.

The amount of the resorcin or resorcin derivative compounded is from 0.5 to 5 parts by weight per 100 parts by weight of the rubber component. Where the amount of the resorcin or resorcin derivative compounded is less than 0.5 parts by weight, good adhesive properties to a steel cord are not obtained. Where the amount exceeds 5 parts by weight, heat resistance of the rubber composition deteriorates, and additionally, elastic modulus is increased, becoming brittle, and as a result, durability is decreased.

The hexamethylene tetramine or melamine derivative as a methylene donor is compounded in an amount of 0.5 to 2 times the weight part of the resorcin or resorcin derivative. The melamine derivative includes a partially etherified product of methylolmelamine, and a compound obtained by methoxylating a reaction product between melamine and formalin with methanol, and its amount compounded is an amount which conducts sufficient reaction and hardening to at least resorcin and the like.

Other than the above components, various compounding ingredients generally compounded with a rubber composition can optionally be compounded with the rubber composition according to the present invention, and its amount compounded can be an amount generally used. Those compounding ingredients include a vulcanizing agent, a vulcanizing accelerator, a softener, zinc white, stearic acid, a wax, an age resister and a processing aid, and can appropriately be compounded in a range that does not depart from the object of the present invention.

The rubber composition for a steel cord of the present invention can be prepared by kneading using a mixing machine generally used, such as Banbury mixer or a kneader. The rubber composition is used as a covering (topping) rubber of a steel cord used as a reinforcing member of a pneumatic tire, and can further be applied as a belt edge cushion rubber of a tire and a belt under pad rubber.

The FIGURE is a half sectional view in a width direction of a tire T, showing one embodiment of a pneumatic tire to which the rubber composition according to the present invention can be applied. As shown in the FIGURE, the pneumatic tire T comprises one radial carcass 1 comprising a steel cord locked by a bead core 10 embedded in a pair of bead parts, four belt layers 2 comprising a steel cord provided in an outward tread part 6 in a tire radial direction of the carcass 1, and a steel chafer 8 provided outside of a carcass 1 winding up pair of the bead part, and is a radial tire for truck and bus, having a general inner structure in which a belt edge cushion rubber 5 is provided between the belt edges of second and third layers in a tire circumferential direction, and a belt under pad 7 is provided between the belt edge and the carcass 1 in a tire circumferential direction.

The rubber composition of the present invention can be used in a topping rubber of the carcass 1, the belt 2 and the steel chafer 8, and additionally, can be applied to a steel cord peripheral rubber such as the belt edge cushion rubber 5 or the belt under pad rubber 7.

The steel cord used in the carcass 1, the belt 2 and the chafer 8 of the tire T includes steel cords of 3+9×0.22(+1), 3+9+15×0.175(+1), and 3×0.20+6×0.35 structures. The steel cord used in the reinforcing member of a tire is generally that a brass plating in a ratio of copper:zinc=(63 to 67):(37 to 33) is applied to a steel filament surface in a plating thickness of from 3 to 7 g/kg. The rubber composition of the present invention has good initial adhesioness to the brass-plated steel cord, and additionally exhibits excellent heat-resistant adhesioness and wet heat-resistant adhesioness to the generation of heat of a tire during running. Needless to say, the rubber composition of the present invention can be used in steel cords of tires for various uses, such as for passenger cars or for construction vehicles.

The rubber composition according to the present invention can be applied to steel cords or bead wires, having applied thereto, a ternary alloy plating comprising brass having added thereto a small amount of a third metal such as nickel or cobalt, a bronze plating, a tin plating or a zinc plating, other than the brass plating. Furthermore, the rubber composition can be used as a rubber for a steel cord for reinforcing various rubber products such as a conveyer belt.

EXAMPLES

The present invention is specifically described below based on the Examples, but the invention is not construed as being limited thereto.

Carbon black, composite graphite particles and boron-containing organic acid cobalt shown below in the compounding amounts (parts by weight) shown in the Table 1, and the common formulation components (parts by weight) shown below were compounded with 100 parts by weight of a natural rubber (RSS #3, made in Thailand), and the resulting mixtures each were kneaded using a sealed Banbury mixer having a volume of 20 liters to prepare rubber compositions of Examples and Comparative Examples.

Carbon Black, Composite Graphite Particles, and Boron-Containing Organic Acid Cobalt Carbon black HAF: SHOWBLACK N326, manufactured by Showa Cabot K.K.

Carbon black SAF: SEAST 9, manufactured by Tokai Carbon Co., Ltd.

Composite graphite particle BH110: BH110, manufactured by Nippon Steel Chemical Carbon Co., Ltd., carbide of boron ($B_4C$):carbon element=1:10 (molar ratio)

Composite graphite particle BH1100: BH1100, manufactured by Nippon Steel Chemical Carbon Co., Ltd., carbide of boron ($B_4C$):carbon element=1:100 (molar ratio)

Boron-containing organic acid cobalt: MANOBOND C22.5, C680C, manufactured by OMG Common Formulation Component Zinc while: 8 parts by weight, Zinc White #3, manufactured by Mitsui Mining & Smelting Co., Ltd.

Age resister 6C: 2 parts by weight, SANTOFLEX 6PPD, manufactured by Monsant

Vulcanization accelerator DZ: 1 parts by weight, NOC-CELER DZ-G, manufactured by Ouchi Shinko Chemical Industrial Co., Ltd.

Resorcin-alkyl phenol-formalin copolymer: 2 parts by weight, SUMIKANOL 620, manufactured by Sumitomo Chemical Co., Ltd.

Melamine derivative (hexamethoxymethylmelamine): 4 parts by weight, CYLETS 963L, manufactured by Mitsui Cytec, Ltd.

Insoluble sulfur: 4.5 parts by weight, CRYSTEX OT-20, manufactured by Akzo

Each rubber composition obtained was evaluated on initial adhesioness, heat-resistant adhesioness and wet heat-resistant adhesioness according to the following methods. The results obtained are shown in the Table 1 below.

Initial Adhesioness

Brass-plated steel cords (3×0.20+6×0.35 structure, copper:zinc=64:36%, plating deposition amount: 6 g/kg) were arranged in parallel at a distance of 12 steel cords/25 mm, and both sides of the cords were sandwiched between two sheets having a thickness of 0.8 mm of each rubber composition shown in the Table 1 to prepare a cord/rubber composite sheet. Two composite sheets were superposed such that cord arrangement directions are parallel, and the resulting assembly was press vulcanized at 150° C. for 30 minutes to prepare an adhesioness evaluation sample. This sample was adjusted to a measurement sample having a width of 25 mm, and peeling adhesive force (N/25 mm) was measured by a T-shaped peeling test using an autograph manufactured by Shimadzu Corporation. The result obtained is indicated by an index as the adhesive force of Comparative Example 1 being 100. The larger value shows good adhesioness.

Heat-Resistant Adhesioness

The measurement sample having a width of 25 mm was aged in a gear oven adjusted to 160° C. for 96 hours, and peeling adhesive force (N/25 mm) of the sample was measured in the same manner as in the evaluation method of initial adhesioness. The result obtained is indicated by an index as the adhesive force of Comparative Example 1 being 100. The larger value shows good adhesioness. Furthermore, retention (%) indicates the retention to initial adhesive force, and the larger value is good.

Wet Heat-Resistant Adhesioness

The measurement sample having a width of 25 mm was aged in a sealed vessel adjusted to 105° C. and 100% RH for 96 hours, and peeling adhesive force (N/25 mm) of the sample was measured in the same manner as in the evaluation method of initial adhesioness. The result obtained is indicated by an index as the adhesive force of Comparative Example 1 being 100. The larger value shows good adhesioness. Furthermore, retention (%) indicates the retention to initial adhesive force, and the larger value is good.

The rubber composition for adhering a steel cord of the present invention is useful as a covering rubber of a steel cord for reinforcing various rubber products such as a conveyer belt, including a steel cord for a tire, and can be applied as a peripheral rubber of a steel cord.

What is claimed is:

1. A method for producing a rubber-steel cord composite comprising:
    heating and graphitizing carbon black together with boron or a compound containing boron thereby to obtain composite graphite particles comprising a graphite structure and a carbide of boron formed on the surface of the graphite structure,
    mixing 100 parts by weight of a diene rubber component and from 0.1 to 30 parts by weight of the composite graphite particles thereby to prepare a rubber composition, and
    covering a steel cord with the rubber composition thereby to obtain the rubber-steel cord composite.

2. The method as claimed in claim 1, wherein the steel cord has brass plated thereon, and the rubber composition is applied to the steel cord.

3. The method as claimed in claim 1, wherein the heating is conducted at a temperature of 1500° C. or higher.

4. The method as claimed in claim 1, wherein the heating is conducted by induction heating the carbon black and the boron or the compound containing boron in an induction furnace.

TABLE 1

| | | Com. Ex. 1 | Com. Ex. 2 | Ex. 1 | Ex. 2 | Ex. 3 | Ex. 4 | Ex. 5 | Ex. 6 |
|---|---|---|---|---|---|---|---|---|---|
| Formulation | Carbon black | | | | | | | | |
| | HAF | 60 | 60 | 60 | | 60 | 60 | 60 | 60 |
| | SAF | | | | 60 | | | | |
| | Composite graphite Particle | | | | | | | | |
| | BH110 | | | 0.13 | 0.13 | 5 | 10 | 30 | |
| | BH1100 | | | | | | | | 10 |
| | MANOBOND C22.5 | 0.8 | 1.6 | 0.8 | 0.8 | 0.8 | 0.8 | 0.8 | 0.8 |
| | Total boron amount | 0.012 | 0.024 | 0.024 | 0.024 | 0.466 | 0.921 | 2.739 | 0.112 |
| Result | Initial adhesive force (index) | 100 | 109 | 109 | 121 | 117 | 134 | 130 | 113 |
| | Adhesive force after heat aging (index) | 100 | 115 | 134 | 138 | 142 | 175 | 189 | 138 |
| | Retention of adhesive force after heat aging (%) | 56 | 59 | 60 | 62 | 69 | 73 | 81 | 64 |
| | Adhesive force after wet heat aging (index) | 100 | 119 | 118 | 129 | 119 | 120 | 122 | 118 |
| | Retention of adhesive force after wet heat aging (%) | 50 | 77 | 76 | 80 | 79 | 80 | 82 | 77 |

It is seen from the results shown in the Table 1 that each Example according to the present invention shows high value of initial adhesioness as compared with Comparative Example 1 (related art), and both heat-resistant adhesioness and wet heat-resistant adhesioness are improved. Furthermore, Comparative Example 2 in which boron component was merely increased is insufficient in improvement of heat-resistant adhesioness (in comparison with Examples 1 and 2), and the effect of using composite graphite particles is apparent. Moreover, it is seen from the results of Example 5 that when the amount of the composite graphite particles compounded is about 30 parts by weight, the effect achieves equilibrium.

5. The method as claimed in claim 1, wherein the carbon black has an average particle diameter of 500 nm or less.

6. The method as claimed in claim 1, wherein a molar ratio of the carbide of boron ($B_4C$) constituting the composite graphite particles to the total carbon atoms in the composite graphite particles excluding carbon atoms contained in the carbide is from 1:5 to 1:500.

7. The method as claimed in claim 1, wherein an organic acid cobalt salt is further compounded in a proportion of from 0.1 to 0.3 parts by weight, in terms of a cobalt metal content, per 100 parts by weight of the diene rubber component.

8. The method as claimed in claim 1, wherein a resorcin or a resorcin derivative is further compounded in a proportion of from 0.5 to 5 parts by weight per 100 parts by weight of the diene rubber component, and hexamethylene tetramine or a melamine derivative is further compounded in an amount of 0.5 to 2 times the weight part of the resorcin or resorcin derivative.

* * * * *